United States Patent Office 3,538,212
Patented Nov. 3, 1970

3,538,212
AGGLOMERATED SILICA BODIES AND METHOD
Raymond Beau, Massy, and Jean Fourniguet, Paris, France, assignors to Produits Chimiques Pechiney-Saint-Gobain, Neuilly-sur-Seine, France
No Drawing. Filed Sept. 18, 1968, Ser. No. 760,714
Claims priority, application France, Sept. 20, 1967, 121,591
Int. Cl. C01b 33/16
U.S. Cl. 264—117
5 Claims

ABSTRACT OF THE DISCLOSURE

The production of agglomerated bodies of silica wherein a composition formed in whole or in part of silica hydrogen microballs is agglomerated and which includes the treatment of the microballs prior to agglomeration with an alkaline medium to increase the composite strength of the agglomerated bodies.

---

This invention relates to agglomerated silica bodies based upon spherical particles of silica hydrogel.

Silica bodies are used in such applications as adsorption and catalysis. For such purposes, it has been proposed to make use of different shapes of bodies, at least partially constituted of silica, and obtained by different methods.

One method consists in agglomerating particles of silica gel obtained by fragmentation or precipitated fine silica particles to which other products constituting simple charges or destined to have a particular action in adsorption or in catalysis can be added. Many of these agglomerated bodies often have insufficient mechanical strength notwithstanding the frequent use of adjuvants, such as binders, which are sometimes difficult to work out with silica particles in that when dried, they are too absorbent towards such binders or when wet, they dilute the binders excessively.

Other methods consist in forming almost spherical bodies by spray drying suspensions of fine silica particles or silica sols or by gelation of droplets of silica sols having little if any solubility with water. These last well known methods lead, in the case of spray drying, to bodies having a very small diameter and are particularly adapted for use in fluidized beds. In the case of gelification of sol droplets, spherical bodies are produced ranging from microballs having a diameter of some microns to balls having a diameter of some millimeters. The latter have sufficient size to be used in some applications, particularly in fixed beds. In spite of their excellent solidity in the dry state, they present numerous drawbacks when submitted to action in an environment rich in water. The rapid take-up of water often leads to their fractionation and bursting. It is obvious that such spherical bodies are, for this reason, not often transformed into catalysts by impregnation with different aqueous solutions.

We have found, in accordance with the process of this invention, that in the agglomeration of silica bodies, the supply of all or part of the silica in the state of hydrogel microballs operates markedly to increase the mechanical strength of the obtained bodies and that these bodies can be easily impregnated with different solutions or suspensions, dried and calcined, to produce various catalysts.

More particularly, it has been found that washing the microballs in the clearly alkaline medium, by means of an ammonia solution, leads to agglomerates having high solidity and ones which can be impregnated by different solutions.

It is an object of this invention to produce such agglomerated silica bodies formed at least in part of silica hydrogen microballs, as well as the applications of such agglomerated bodies, particularly in the field of adsorption and catalysis.

Most of the known processes of agglomeration can be used for the preparation of the silica agglomerated bodies which form the object of this invention. However, whichever process is used, the work supplied to the microballs should not operate excessively to crush the microballs. It is only necessary that the microballs be highly pressed one against another without excessive turbulence. Such processes are, for instance, by compression, by agglomeration during rotation in a granulating mill and by extrusion. After drying, calcination converts the silica agglomerated bodies to the desired porous characteristics. In the instances where the presence of other bodies is desired, those other elements can be added to the microballs of silica hydrogel while in a solid state, in solution or suspension or added while in solution or suspension to the silica agglomerated bodies after drying, or after drying and calcination. The following examples are given by way of illustration, but not by way of limitation, of the practice of this invention:

EXAMPLE 1

Silica hydrogel microballs having an average diameter of 104 microns are obtained by coagulation in a column filled with trichlorethylene maintained at 70° C., of a silica sol having a concentration of 100 g./l. and a pH of 4, prepared by reaction of nitric acid on a solution of sodium silicate. After eliminating the trichlorethylene by azotropic drainage, the microballs are washed at a pH of 9 with ammoniacal water. Centrifugal drying decreases the wet ratio of the microballs to 85%. Agglomeration is achieved by compression in a gear machine having teeth, the bottoms of which are perforated with holes having a diameter of 12 mm. to yield small cylinders of the agglomerated material. After oven drying at 100° C., the medium crushing strength of the average of 10 agglomerates is 3.5 kg.

EXAMPLE 2

Silica hydrogel microballs, having an average diameter of 290 microns, obtained as in Example 1 but from a silica sol of 100 g./l., prepared of phosphoric acid from a solution of sodium silicate, are washed with an alkaline medium at a pH of 9. The agglomerates, obtained in the same manner as in Example 1, give an average crushing strength of 4.6 kg., after drying at 100° C., in a drying oven.

EXAMPLE 3

Microballs having a size similar to those described in the preceding Example 2 were obtained from a silica sol which is the same as that of Example 1 and are washed with a solution having a pH of 9. The agglomerates, obtained by the machine of the preceding examples, give an average strength of 5.2 kg. after drying at 100° C.

EXAMPLE 4

Silica hydrogel microballs prepared of the silica sol which is the same as in Example 3, and having a mean diameter of 800 microns, are washed with a solution having a pH of 2. After agglomeration by the same machine as in the preceding examples, silica bodies are produced having an average strength of 1.3 kg. after drying at 100° C.

EXAMPLE 5

Silica hydrogel microballs having an average diameter of 300 microns are prepared under the same general conditions described in the preceding examples from a silica sol of 100 g./l. secured by the reaction of sulphuric acid on sodium silicate. A volume of 3.5 liters of microballs, washed at a pH of 9 but without being centrifuged, are placed in a granulating mill having a capacity of 19 liters and heated by means of electric resistance heaters. By progressive evaporation, the microball mass changes to a liquid paste which becomes stiff and then divides into agglomerates which are slowly transformed into balls. The balls having a diameter within the range of 2–10 mm., are dried in a drying oven at 60° C. for five days and then are calcined for one hour at 800° C. The balls give an average crushing strength of 8 kg.

EXAMPLE 6

The same microballs of silica hydrogel as produced in the preceding Example 5 are passed, after slight centrifugal drying, through an extruding machine of the screw type having a nozzle opening of 30 mm. in diameter and a rod insert having a diameter of 8 mm. whereby a tubing having an external diameter of 30 mm. and an internal diameter of 8 mm. is produced therefrom. The tubing is cut to lengths of 15 mm. The tubing sections contract upon drying in air to an external diameter of 16 mm. and an internal diameter of 6 mm. After calcination for one hour at 800° C., shrinkage occurs with the result that the tubing has an external and internal diameter of 13.5 and 5 mm., respectively. The average strength of the agglomerate is 2 kg. in the crosswise direction and 8 kg. in the lengthwise direction.

It will be apparent from the foregoing that new and improved silica bodies formed of silica hydrogel microballs are produced wherein the strengths of the bodies are increased by treatment with alkaline solutions as compared to the low strengths when treated on the acidic side, as represented in Example 4.

It will be understood that changes may be made in the details of formulation and operation without departing from the spirit of the invention, especially as defined in the following claims.

We claim:
1. A process of forming agglomerated silica gel bodies of improved crushing strength comprising the steps of forming the silica into microballs, washing the formed microballs of silica hydrogel with an aqueous ammoniacal solution having a pH of 9, substantially drying the microballs, forming agglomerates of said microballs by compression without crushing, and then drying the agglomerates at an elevated temperature.

2. A process as claimed in claim 1 in which the silica hydrogel microballs are agglomerated by a granulating mill.

3. A process as claimed in claim 1 in which the silica hydrogel microballs is agglomerated by extrusion.

4. A process as claimed in claim 1 which includes the step of calcining the agglomerated silica bodies after drying.

5. Silica agglomerated bodies produced by the method of claim 1.

References Cited

UNITED STATES PATENTS

| | | | |
|---|---|---|---|
| 2,595,056 | 4/1952 | Connolly | 252—455 |
| 3,165,379 | 1/1965 | Schwartz | 23—112 |
| 3,231,649 | 1/1966 | Pfeiffer | 264—109 |
| 3,383,169 | 5/1968 | Young | 23—112 |
| 3,345,437 | 10/1967 | Flack et al. | 264—13 X |
| 2,492,808 | 12/1949 | Marisic et al. | 264—13 X |

ROBERT F. WHITE, Primary Examiner

J. R. HALL, Assistant Examiner

U.S. Cl. X.R.

23—182